United States Patent [19]
Baas

[11] Patent Number: 5,134,599
[45] Date of Patent: Jul. 28, 1992

[54] EQUIPMENT FOR PLAYING BACK DATA

[75] Inventor: Dieter Baas, Kehl, Fed. Rep. of Germany

[73] Assignee: Deutsche Thomson-Brandt GmbH, Villingen-Schwenningen, Fed. Rep. of Germany

[21] Appl. No.: 250,733

[22] Filed: Sep. 28, 1988

[30] Foreign Application Priority Data

Sep. 30, 1987 [DE] Fed. Rep. of Germany ....... 3732916

[51] Int. Cl.⁵ .................. G11B 17/22; G11B 7/00; G11B 21/10
[52] U.S. Cl. .................. 369/32; 369/44.27; 369/44.28
[58] Field of Search .......... 369/32, 44.28, 44.27; 360/78.03, 78.04, 78.05, 78.06, 78.07

[56] References Cited

U.S. PATENT DOCUMENTS

| | | | |
|---|---|---|---|
| 4,333,117 | 6/1982 | Johnson | 360/78 |
| 4,598,394 | 7/1986 | Nonaka | 369/44.28 |
| 4,607,358 | 8/1986 | Maeda et al. | 369/44.28 |
| 4,740,939 | 4/1988 | Kimura et al. | 360/78.06 |
| 4,817,073 | 3/1989 | Suzuki | 369/44.28 |
| 4,899,325 | 2/1990 | Katsuhara | 360/78.06 |
| 4,930,114 | 5/1990 | Tateishi | 369/124 |
| 4,937,689 | 6/1990 | Seaver et al. | 360/78.07 |

FOREIGN PATENT DOCUMENTS

| | | | |
|---|---|---|---|
| 10001682 | 1/1985 | Japan | 360/78.06 |
| 0117328 | 5/1988 | Japan | 369/44.28 |

Primary Examiner—Stuart S. Levy
Assistant Examiner—Tan Nguyen
Attorney, Agent, or Firm—Max Fogiel

[57] ABSTRACT

A method for skipping tracks in apparatus playing back data that is readable from data-storage tracks on a recording medium by an optical scanner when a base of light is positioned on the tracks by a tracking circuit. The optical scanner is shifted from one data track to another by a skipping pulse during a track-skipping procedure, and is halted in place there by a braking pulse. The tracking circuit is opened not prior to the beginning of the skipping pulse and not later than the departure from the data-storage track. The optical scanner is braked by a first braking pulse of constant length and amplitude, but which is too small. A second braking pulse is produced with pulse characteristics dependent on the time that elapses until a predetermined point on the next data-storage is arrived at. The second braking pulse thereby halts the scanner in the middle of the next data-storage track. The tracking circuit is then closed, but not prior to the beginning of the second braking pulse and not later than the middle of the next data-storage track.

14 Claims, 2 Drawing Sheets

EQUIPMENT FOR PLAYING BACK DATA

BACKGROUND OF THE INVENTION

The invention concerns equipment for playing back data that can be read from the data-storage tracks on a recorded medium by means of an optical pick-up when a beam of light is positioned over the tracks by a tracking circuit, whereby the optical pick-up is shifted to the desired track by a hunting or skipping or track-skipping pulse during the track-hunting process and halted there by a braking pulse.

Equipment of this type—compact-disk players, optomagnetic equipment for recording and playing back, and recording and playback equipment for DRAW disks or videodisc players for example—are provided with an optical pick-up consisting of a laser diode, several lenses, a prismatic beam divider, and a photodetector. The design and function of an optical pick-up are described in Electronic Components and Applications 6 (1984) 4, 209–15.

The beam of light emitted by the laser diode is focused by lenses onto the compact disk, which reflects it onto a photodetector. The data stored on the disk and the actual value for the focusing and tracking circuits are obtained from the photodetector output signal. The aforecited passage calls the actual value for the focusing circuit a focusing error and the actual value for the tracking circuit a radial tracking error.

The element that controls the focusing circuit is a coil with an objective lens that travels along its optical axis within the magnetic field. The focusing circuit moves the lens back and forth to keep the beam of light emitted by the laser diode constantly on the compact disk. The tracking circuit, which is often called the radial drive mechanism, moves the optical pick-up radially over the compact disk, positioning the beam of light on the spiral data tracks on the disk.

The radial drive mechanism in some equipment comprises what is called a coarse-drive mechanism and of what is called a fine-drive mechanism. The coarse-drive mechanism is for example in the form of a spindle that radially moves the overall optical pick-up consisting of the laser diode, the lenses, the prismatic beam divider, and the photodetector. The fine-drive mechanism can tilt the beam of light radially, at a prescribed slight angle for example, allowing the beam of light, due to the tilting alone, to travel a short distance along one radius of the compact disk.

To ensure unobjectionable playback of data, whether video and audio in a videodisk player or just audio in a compact-disk player, the beam of light must not only be precisely focused on the videodisk or compact disk but also precisely guided along the data-storage tracks on the disk.

European Patent 0 035 288 describes a playback device of the aforesaid type wherein the hunting on the part of the optical pick-up from one track to another is controlled by a hunting pulse, called a "jump pulse" in that text, and wherein the pick-up is halted in place above the desired track at the end of the movement by a braking pulse called a "compensate" pulse. Since, however, the braking pulse is always the same, it will not be optimal for every situation. The pick-up can for example halt ahead of or on the other side of the desired track, in which cases the access time to the desired data will be increased because subsequent corrections have to be made.

U.S. Pat. No. 4,495,608 discloses device for hunting tracks wherein the leap over one or more tracks is also initiated by a hunting pulse and terminated by a braking pulse. To make it possible to attain the desired track more precisely and rapidly, the duration of the braking pulse depends on the speed at which the pick-up travels over the tracks. The pulse is longer at higher speeds and shorter at lower speeds. It is, however, nevertheless possible with this device for the desired track not to be located immediately, so that subsequent corrections still have to be carried out. Critical situations can also occur in conjunction with the stability of this tracking circuit.

SUMMARY OF THE INVENTION

The object of the invention is accordingly to optimize the braking pulse that halts the optical pick-up during track hunting in equipment and hence eliminate the necessity of corrections.

One embodiment of the method in accordance with the invention comprises the steps of a) emitting a hunting pulse, b) opening the tracking circuit not prior to the beginning of the hunting pulse and no later than the departure from the data-storage track, c) braking the optical pick-up by means of a braking pulse of constant length and amplitude that is, however, too short, d) measuring the time that elapses until a prescribed point on the next data-storage track is arrived at, e) emitting another braking pulse with a length and/or amplitude that depend on the results of the time measurement and accordingly halting the pick-up in the middle of the next data-storage track, and f) closing the tracking circuit not prior to the beginning of the second braking pulse and no later than the middle of the next data-storage track.

Another embodiment of the method in accordance with the invention comprises the steps of a) emitting a hunting pulse that initiates a trial leap over at least one data-storage track, b) opening the tracking circuit not prior to the beginning of the hunting pulse and no later than the departure from the data-storage track, c) braking the optical pick-up by means of a trial braking pulse, d) closing the tracking circuit at a prescribable point on one of the next data-storage tracks, and e) obtaining the amplitude and/or duration of the braking pulse that will be needed for subsequent leaps from the transience of the actual value of the tracking circuit and storing the result.

DESCRIPTION OF THE PREFERRED EMBODIMENTS

Figure 1:
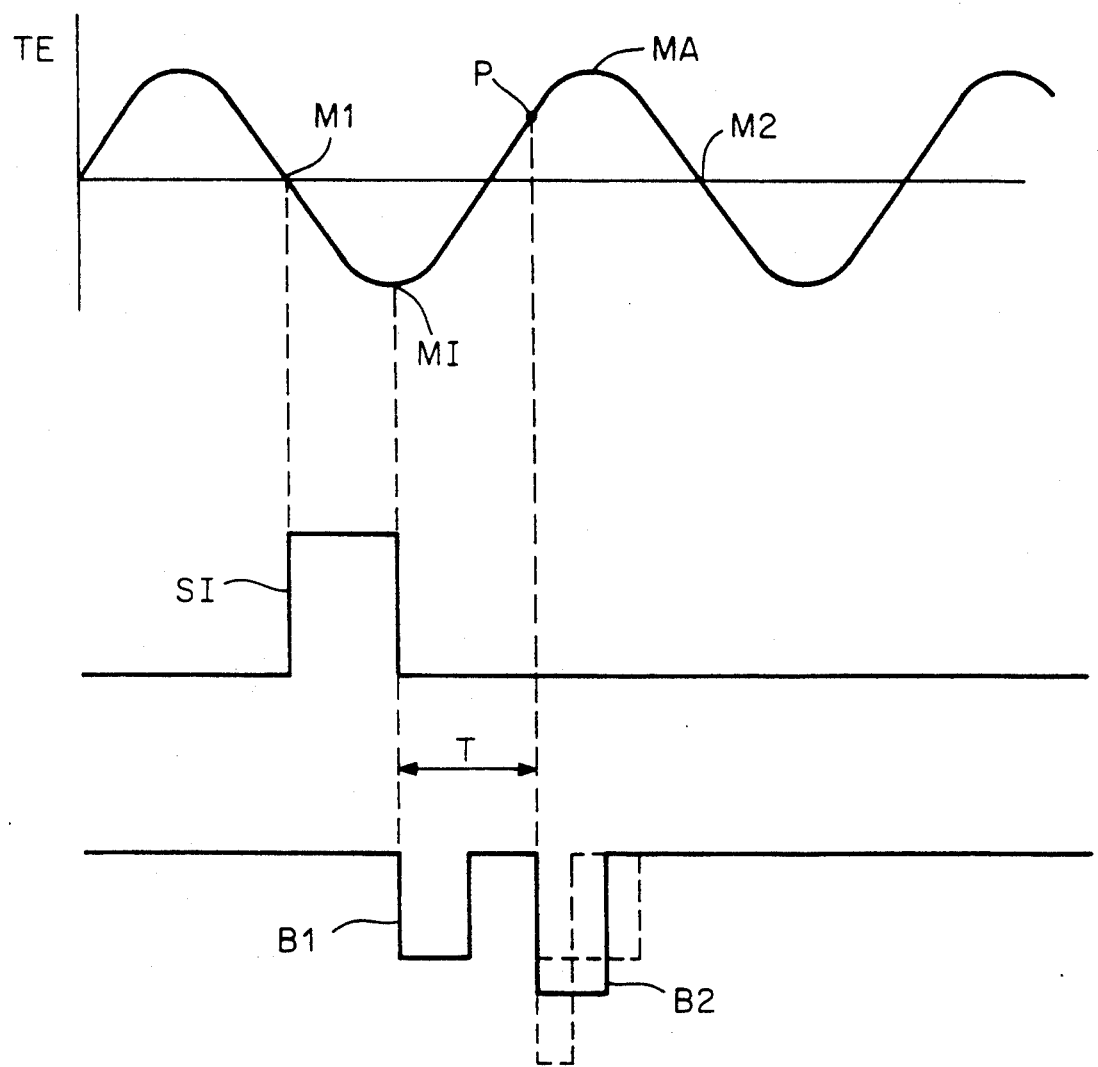
FIG. 1 is an embodiment in accordance with the present invention, and represents a graph of a tracking error TE, a hunting pulse SI, and two braking pulses B1 and B2.
Figure 2:
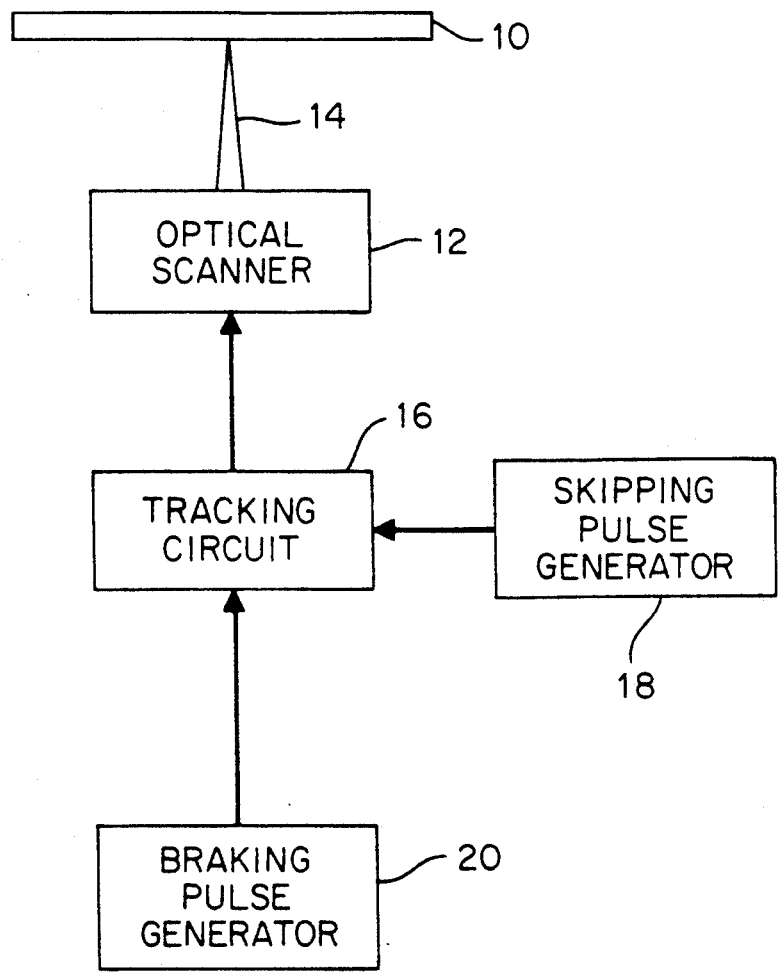
FIG. 2 is a block diagram and shows the elements, in accordance with the present invention.

In accordance with the present invention, a recording medium 10 with data-storage tracks that are readable by an optical scanner 12 when a beam of light 14 is positioned on the tracks by a tracking circuit 16. The optical scanner 12 is shifted from one data-storage track to another adjacent data-storage tack by a pulse from a skipping pulse generator 18 during a track skipping procedure. The optical scanner is halted there by a pulse from a braking pulse generator 20. Tracking error TE is sinusoidal. A first transition through zero means that the beam of light is precisely in the middle of the track, the next transition through zero that it is between two tracks, and the next that it is in the middle of the next track. Whether the pick-up is in the middle of a track or between two tracks during a transition through zero can be determined from a high-frequency signal. If a high-frequency signal is present, the pick-up is on a track. If there is noise instead of a high-frequency signal, the pick-up is between two tracks. The situation can easily be determined with a high-frequency detector.

A leap from one track to the next is initiated by a hunting pulse SI that ends for example when the beam of light deviates one quarter of the width of the track to the right from the middle M1 of the track, with the sinusoidal tracking error TE at a minimum MI. The tracking circuit is then opened, and a braking pulse B1 of constant duration and amplitude is emitted. The tracking circuit must be opened not prior to the beginning of hunting pulse SI and no later than the departure from the data-storage track. The amplitude and duration of braking pulse B1 must be short enough to ensure that the optical pick-up is only braked and not halted. Braking pulse B1 can end for example before tracking error TE becomes positive again, before, that is, the beam of light arrives at the next data-storage track. The braking pulse can also merge into another braking pulse.

When, then, the beam of light is at the edge of the next track, tracking error TE will again increase sinusoidally. The time elapsing between the first intentionally too small braking pulse B1 and a prescribed point P in tracking error TE, upstream of the maximum MA for that track for example, is measured. In other words, the time elapsing between braking pulse B1 and the point at which tracking error TE attains a prescribed threshold is measured. Another braking pulse B2 is now emitted to halt the optical pick-up in the middle M2 of the track. The amplitude and/or duration of braking pulse B2 depends on the measured time T. The tracking circuit can now be closed again. It must, however, be closed again not prior to the arrival at the next data-storage track and no later than the middle M2 of the track.

If the elapsed time T in the present embodiment is short, the amplitude and/or duration of second braking pulse B2 will be long. If on the other hand a lot of time T elapses, the amplitude and/or duration of the braking pulse B2 will be short. This process ensures rapid and accurate hunting from one track to the next.

It is of particular advantage in optimizing second braking pulse B2 to vary both its amplitude and its duration as represented by the discontinuous lines in the figure.

When the pick-up is intended to leap over several tracks, the method recited in claim 1 is repeated from track to track.

Even though the optical pick-up is initially halted at each track and then accelerated again in the method in accordance with the invention, the access time to the desired track hardly increases at all in comparison with the device known from U.S. Pat. No. 4,495,608 because corrections are very extensively eliminated in the method in accordance with the invention.

In another embodiment of the invention a hunting pulse is emitted first to initiate a trial hunt over one or more tracks. The tracking circuit is opened for this purpose. The tracking circuit must be opened not prior to the beginning of the hunting pulse and no later than the departure from the data-storage track. The pick-up is then braked by a trial braking pulse. The amplitude and/or duration of the braking pulse that will be needed for later leaps are then definitely established from the transience of the tracking error and stored in a memory.

During later leaps over one or more tracks the pick-up is accordingly halted at the desired track by a braking pulse with an amplitude and/or duration that have been established by the trail braking pulse and then stored.

It is of particular advantage, once a recording has been placed in the player, to determine the parameters of the braking pulse that will be needed for later hunting by means of the trial braking pulse. A "specific" braking pulse can accordingly be established for each recording to be played.

To extensively eliminate drift on the part of individual parameters during playback as the result of temperature fluctuations, it is practical to carry out a trial hunt during each pause in data playback in order to establish parameters for the braking pulse. The amplitude and duration of the braking pulse are in this way constantly updated.

The amplitude and/or duration of the braking pulse needed for the following hunt can be established and stored anew during each leap.

There can be several braking pulses instead of only one. The parameters of all the braking pulses or of individual braking pulses, the amplitude and/or duration of the most recent braking pulse for example, can be constantly adapted to the hunting conditions.

The invention is appropriate for compact-disk players, videodisk players, DRAW-disk players, and opticomagnetic equipment.

I claim:

1. A method for skipping tracks in apparatus playing back data readable from data-storage tracks on a recording medium by an optical scanner when a beam of light is positioned on the tracks by a tracking circuit, said optical scanner being shifted from one data-storage track to another adjacent data-storage track by a skipping pulse during a track skipping procedure and halted there by a braking pulse, said method comprising the steps of:
   (a) emitting a skipping pulse having a beginning;
   (b) opening the tracking circuit subsequent to the beginning of the skipping pulse and before departure from said one data-storage track;
   (c) braking the optical scanner by a first braking pulse of constant length and amplitude, said first braking pulse having a duration less than a predetermined duration;
   (d) measuring a time interval elapsed until said scanner arrives at a predetermined point on said other adjacent track;
   (e) emitting a second braking pulse with at least one pulse characteristic dependent on said measured time interval and correspondingly halting said scanner in a middle of said other adjacent track; and
   (f) closing the tracking circuit subsequent to the beginning of said second braking pulse and before the middle of said other adjacent data-storage track.

2. A method as defined in claim 1, wherein said method steps are repeated from data-storage track to data-storage track when the skipping procedure extends over a plurality of data-storage tracks.

3. A method as defined in claim 1, wherein said pulse characteristic comprises a variable amplitude of the pulse.

4. A method as defined in claim 1, wherein said pulse characteristic comprises a variable duration of the pulse.

5. A method as defined in claim 1, wherein said at least one pulse characteristic comprises a variable amplitude and duration of the pulse.

6. A method for skipping tracks in apparatus playing back data readable from data-storage tracks on a recording medium by an optical scanner when a beam of light is positioned on the tracks by a tracking circuit, said optical scanner being moved to a desired track by a skipping pulse and halted there by a braking pulse, said method comprising the steps of:
(a) emitting a skipping pulse having a beginning for carrying out a trial skip over at least one data-storage track;
(b) opening the tracking circuit subsequent to the beginning of the skipping pulse and before departure from said one data-storage track;
(c) braking the optical scanner by a trial first braking pulse;
(d) closing the tracking circuit at a predetermined position on one of the next data-storage tracks;
(e) obtaining from transience of an actual value of the tracking circuit at least one characteristic of a second braking pulse needed for subsequent track skippings;
(f) storing said at least one characteristic of the said second braking pulse.

7. A method as defined in claim 6, wherein said trial skipping step is carried out before the recording medium is played.

8. A method as defined in claim 6, wherein said trial skipping step is carried out during a pause in playback of data.

9. A method as defined in claim 6, wherein said characteristic of the additional braking pulse needed for subsequent track skippings is obtained from transients of the actual value of the tracking circuit and stored anew during each skipping.

10. A method as defined in claim 6, wherein at least two braking pulses are needed for subsequent track skippings.

11. A method as defined in claim 6, wherein said characteristic of the additional braking pulse comprises a variable amplitude.

12. A method as defined in claim 6, wherein said characteristic of the additional braking pulse comprises a variable duration of said pulse.

13. A method as defined in claim 6, wherein said at least one characteristic of the additional braking pulse comprises a variable amplitude and duration of the pulse.

14. A method for skipping tracks in apparatus playing back data readable from data-storage tracks on a recording medium by an optical scanner when a beam of light is positioned on the tracks by a tracking circuit, said optical scanner being moved under arbitrary unregulated motion to a only desired track by a skipping pulse and halted there by a braking pulse, said method comprising the steps of:
(a) emitting a skipping pulse having a beginning for carrying out a trial skip over at least one data-storage track;
(b) opening the tracking circuit subsequent to the beginning of the skipping pulse and before departure from said one data-storage track;
(c) braking the optical scanner by a trial first braking pulse;
(d) closing the tracking circuit at a predetermined position on one next data-storage tracks;
(e) obtaining from transients of an actual value of the tracking circuit at least one characteristic of a second braking pulse needed for subsequent track skippings;
(f) carrying out the trial skipping step before playing the recording medium;
(g) obtaining said characteristic of said second braking pulse needed for subsequent track skippings from transients of the actual value of the tracking circuit and storing anew during each skipping.

* * * * *